United States Patent [19]

Kullmann et al.

[11] Patent Number: 5,558,184

[45] Date of Patent: Sep. 24, 1996

[54] SLANTED BRAKE ROTOR

[75] Inventors: Bernhard W. Kullmann, Rochester Hills; Joerg L. Scheibel; Werner Gottschalk, both of Auburn Hills, all of Mich.

[73] Assignee: ITT Automotive, Auburn Hills, Mich.

[21] Appl. No.: 481,979

[22] Filed: Jun. 7, 1995

[51] Int. Cl.$^6$ ........................................... F16D 65/20
[52] U.S. Cl. .......................................... 188/72.4; 188/73.1
[58] Field of Search .................................. 188/71.1, 72.1, 188/72.4, 72.7, 73.1, 73.2, 73.41–73.43, 76, 153 A, 365, 370, 73; 192/85 AA, 85 AT, 107 R

[56] References Cited

U.S. PATENT DOCUMENTS

| | | | |
|---|---|---|---|
| 3,122,221 | 2/1964 | Rucker | 188/70 R |
| 3,186,517 | 6/1965 | Harrison | 188/73.41 |
| 3,273,675 | 9/1966 | Brown | 188/73.41 |
| 3,378,114 | 4/1968 | Hollins | 188/218 X |
| 3,422,934 | 1/1969 | Hambling | 188/72.4 |
| 3,433,328 | 3/1969 | Swift | 188/72.4 |
| 3,517,777 | 6/1970 | Beller | 188/73.1 |
| 3,983,969 | 10/1976 | Colpaert et al. | 188/73.6 |
| 3,993,173 | 11/1976 | Hoffman | 188/138 |
| 4,238,007 | 12/1980 | Ygnard | 188/76 |
| 4,289,216 | 9/1981 | Shirai et al. | 188/72.2 |
| 4,374,553 | 2/1983 | Peck et al. | 188/73.45 |
| 4,448,291 | 5/1984 | Ritsema et al. | 188/218 X |
| 4,460,070 | 7/1984 | Mayer et al. | 188/73.1 |
| 4,480,725 | 11/1984 | Brimaud | 188/365 |
| 4,811,822 | 3/1989 | Estaque | 188/264 A |
| 4,930,606 | 6/1990 | Sporzynski | 188/218 X |
| 5,010,985 | 4/1991 | Russell et al. | 188/218 X |
| 5,022,500 | 6/1991 | Wang | 188/73.31 |
| 5,249,649 | 10/1993 | Emmons | 188/73.47 |

FOREIGN PATENT DOCUMENTS

| | | | |
|---|---|---|---|
| 0199785 | 7/1967 | U.S.S.R. | |
| 1019094 | 2/1966 | United Kingdom | 188/73.41 |
| 1108916 | 4/1968 | United Kingdom | 188/73.41 |
| 1150250 | 4/1969 | United Kingdom | 188/72.4 |

*Primary Examiner*—Robert J. Oberleitner
*Assistant Examiner*—Chris Schwartz
*Attorney, Agent, or Firm*—J. Gordon Lewis; Thomas N. Twomey

[57] ABSTRACT

A slanted brake rotor for use in a disc brake assembly includes a flange portion for mounting a wheel wherein the wheel includes an axis of rotation associated therewith, a cylindrical, axially oriented barrel portion extending from said flange, and an annular member extending from the barrel portion. The annular member includes a central axis and two opposing friction faces for engaging a respective friction element during braking. The annular member is slanted or angled from the conventional upright position so that the central axis of the annular member forms an acute angle with the wheel axis of rotation. Each face of the annular member has a free first end, and a respective second end positioned radially inwardly of the first free end, taken with respect to the wheel axis of rotation. Each face is substantially planar between the free first end and the second end. Further, each friction face is substantially parallel to the central axis.

4 Claims, 1 Drawing Sheet

SLANTED BRAKE ROTOR

BACKGROUND OF THE INVENTION

1. Field of the Invention

This invention relates to a rotor or disc used in connection with a disc brake assembly, and, more particularly, relates to a brake rotor that is slanted relative to a wheel axis of rotation.

2. Background Art

Today's brake designers have the unenviable task of having to engineer brake systems, for example disc brake systems, with many of the design limitations already in place; e.g., a predetermined vehicle weight, and the height, width, and depth available for the proposed brake package already determined. For example, in the design of a disc brake assembly for a vehicle of a specified weight, a predetermined minimal rotor swept area (which impacts braking effectiveness) is required in order to meet safety and performance specifications. However, the effective radius of such a rotor (which in turn, places limits on the swept area) in such a system may be limited by, for example, the preselected wheel size and type, and, various suspension design choices that have already occurred and limit the space available for a disc brake assembly (the above-mentioned height, width, and depth). Thus, brake designers have the problem of meeting safety and performance specifications subject to these packaging limitations. Although not applicable in every braking system application, such packaging problems are becoming more prevalent as sub-system specialization in the automotive industry increases.

Accordingly, there is a need to provide an improved braking system that reduces or eliminates one or more of the problems as set forth above.

SUMMARY OF THE INVENTION

The present invention provides the means for increasing the swept area of a rotor of the type used in a disc brake assembly for a given rotor outside diameter and available wheel packaging area. A rotor in accordance with the present invention includes a flange to which a wheel may be mounted; the wheel being rotatable about an axis of rotation. The rotor further includes an annular member extending from the flange. The annular member includes a central axis and two opposing friction faces for engaging a respective friction element during braking. The central axis of the annular member is slanted relative to a line perpendicular to the axis of rotation of the wheel wherein the faces are also slanted. Each friction face includes a free first end, and a second end radially inwardly of the free first end. Each friction face of the annular member being substantially planar between the free first end and the second end, wherein each friction face is also substantially parallel to the central axis. The slanting of the annular member allows a greater effective radius for a given outside diameter of the rotor. The increase in effective radius permits a corresponding increase in rotor swept area.

In a second aspect of the present invention, a disc brake assembly for use in a vehicle is provided that includes a rotor substantially as described above, and a caliper assembly mounted to the vehicle. The caliper assembly includes a housing wherein the housing includes an inboard portion and outboard portion on opposite sides of the rotor for receiving the pair of friction elements. The outboard and inboard portions of the caliper housing are connected by a bridge portion. The caliper assembly further includes a fluid motor means for urging the friction elements into contact with the opposing friction faces of the annular member during braking. The fluid motor means includes a fluid-actuated piston slidably disposed in said housing to move along and thereby apply a force along a longitudinal axis. The longitudinal axis is substantially perpendicular to the opposing friction faces.

These and other features and objects of this invention will become apparent to one skilled in the art from the following detailed description and the accompanying drawings illustrating features of this invention by way of example.

DETAILED DESCRIPTION OF THE PREFERRED EMBODIMENTS

Figure 1:
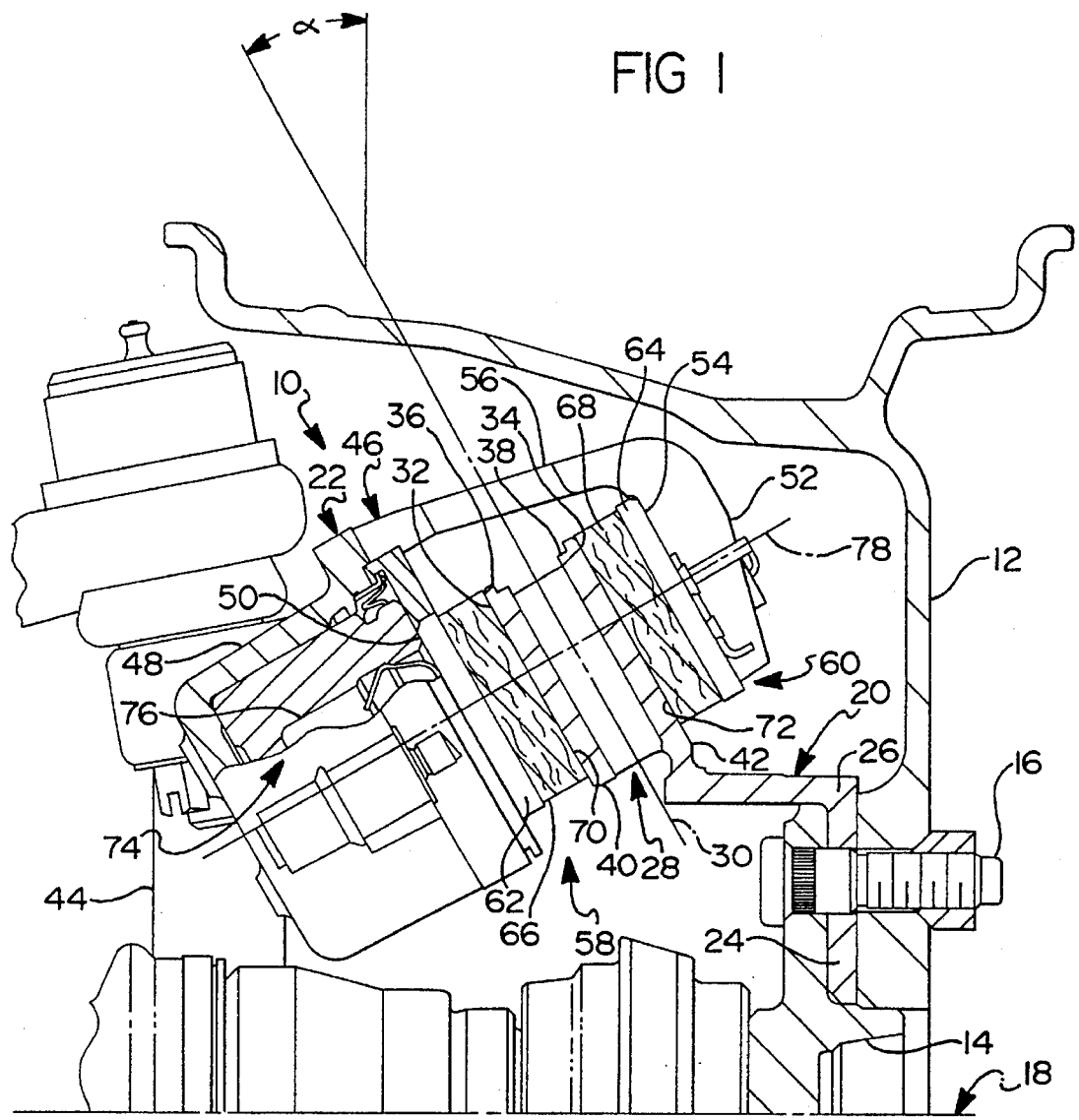
FIG. 1 is a partial cross-sectional view of a slanted disc brake rotor in accordance with the present invention deployed in a preferred environment with a caliper to form a disc brake assembly.

FIG. 1 shows a disc brake assembly 10 for use in a vehicle (not shown) in order to control braking of a wheel assembly 12. The disc brake assembly 10 is connected to a vehicle hub 14, which connection may be by way of lug 16. Lug 16 may also serve to connect wheel 12 to the vehicle. Wheel 12, and hub 14 are rotatable about an axis of rotation 18.

Disc brake assembly 10 includes rotor 20, and caliper assembly 22.

Rotor 20 is rotatably mounted to the vehicle by way of hub 14, and includes a mounting flange 24, a barrel portion 26, and an annular member shown generally at 28.

Mounting flange 24 is generally radially extending relative to axis 18, and may include a plurality of apertures extending therethrough for receiving lugs 16 for mounting wheel 12 thereto.

Barrel portion 26 extends from flange 24 and is generally cylindrical and axially-oriented relative to axis 18.

Annular member 28 extends generally from barrel portion 26 and includes a central axis 30 and two opposing friction faces 32, and 34. In accordance with the present invention, central axis 30 forms an angle $\alpha$ with a line perpendicular to axis 18. Angle $\alpha$ may take any value greater than 0°, up to, but not including, 180°. When $\alpha=90°$, the brake assembly 10 resembles a drum brake system with a pad on the inside and outside. That is, the annular member 28 is cylinder-like. When $\alpha$ approaches 180°, caliper assembly 22 is disposed inside rotor 20.

Each face 32, and 34 includes a respective free end 36, and 38. Also, each friction face 32, and 34 includes a respective second end 40, and 42 positioned radially inwardly of free first ends 36, and 38. Each face 32, and 34 is substantially planar between first free end 36, 38 and a respective second end 40, and 42. Further, friction faces 32, and 34 are each substantially parallel to central axis 30.

Rotor 20, including flange portion 24, barrel 26, and annular member 28 may be constructed using conventional materials using conventional methods. In particular, faces 32 and 34 may be formed and finished using conventional materials and finishing methods, as required by a preselected application. Additionally, the dimensions for rotor 20 may be varied in accordance with the needs of the particular preselected application. It is important, however, that angle α, as defined above, take a value between 0° and 180° (exclusive); by slanting annular member 28 of rotor 20, an increase in the effective radius (contactable surface length) of rotor 20 may be realized.

With continued reference to FIG. 1, caliper assembly 22 is mounted to the vehicle (not shown), as indicated diagrammatically in FIG. 1 by mounting means 44. Mounting means 44 may take any one of a plurality of known connection means.

Caliper assembly 22 includes a housing 46 for providing a base structure. Housing 46 includes an inboard portion 48, which includes an acting or actuating surface 50, a outboard portion 52, which includes an acting or actuating surface 54, and a bridge portion 56. The inboard portion 48, and the outboard portion 52 are disposed on opposite sides of rotor 20 and are provided for receiving an inboard friction element 58, and an outboard friction element 60, respectively. Inboard portion 48, and outboard portion 52 are connected by bridge portion 56.

Friction elements 58, and 60 include respective backing plates 62, and 64, respective friction material portions (lining) 66, and 68, and respective contacting surfaces 70, and 72.

Caliper assembly 22 further includes fluid motor means 74 for urging contacting surfaces 70, and 72 of respective friction elements 58, and 60, by way of actuating surfaces 50, and 54, and backing plates 62, and 64, into contact with respective opposing friction faces 32, and 34 during braking. Fluid motor means 74 includes a fluid-actuated piston 76 slidably disposed in housing 46 to move along longitudinal axis 78. In the preferred embodiment, longitudinal axis 78 is substantially perpendicular to opposing friction faces 32 and 34 wherein the line of force as applied by way of contacting surfaces 70, and 72 is substantially perpendicular to opposing friction faces 32 and 34. As shown in FIG. 1, fluid motor means 74 is disposed in inboard portion 48 of housing 46; however, it should be appreciated that fluid motor means may be disposed on either, or both inboard and outboard portions of housing 48 and remain within the spirit and scope of the present invention. Caliper assembly 22 may take many different forms, as are known and conventional in the art (e.g., fixed, floating, pivoting, etc.).

In operation, the pressurized fluid used to actuate piston 76 may be provided from, for example, a master cylinder (not shown) in response to a user-actuated brake pedal.

Figure 2:
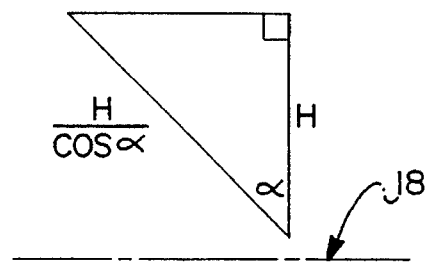
FIG. 2 is a simplified vector representation of an increased swept area of a disc brake assembly using a slanted brake rotor in accordance with the present invention.

Referring now to FIG. 2, a diagram illustrating the improvement of a rotor in accordance with the present invention is graphically illustrated. Assume, for purposes of illustration only, that an effective rotor radius is limited by various packaging constraints to a vertical length H with respect to axis 18. In conventionally disposed disc brake rotors, the annular member of such rotor includes a central axis, that in section, is substantially perpendicular to the axis of rotation 18 of the rotor flange, and wheel. If the central axis is rotated or slanted by a predetermined angle alpha (α), when taken with respect to a line perpendicular to axis 18—such perpendicular line representative of the position of a conventionally disposed rotor, then the effective length of rotor radius may be increased within the same vertical packaging footprint (i.e., for the same rotor outside diameter). For example, if α is 45°, then the effective rotor radius is approximately 1.4*H. Thus a brake rotor in accordance with the present invention not only increases effective rotor radius, which leads to an increased swept area, but also optimizes packaging. It should be appreciated that "swept area" is the area of the rotor that contacts and is "swept" past the brake frictional linings; i.e., total contacted area. Selected angles greater than 45° and approaching 90° will create a braking system similar in appearance and features to that of a drum-type brake.

The preceding description is exemplary rather than limiting in nature. A preferred embodiment of this invention has been disclosed to enable one skilled in the art to practice this invention. Variations and modifications are possible without departing from the purview and spirit of this invention; the scope of which is limited only by the appended claims.

We claim:

1. A disc brake assembly for use in a vehicle having a rotatable hub, comprising:

a rotor mounted to the hub of the vehicle for rotation therewith about an axis of rotation, said rotor including a mounting flange portion for mounting a wheel thereagainst, said rotor further including an annular member coupled to said flange and having a central axis and two opposing friction faces for contacting a respective friction element during braking, said annular member being disposed such that said central axis and a line perpendicular to said axis of rotation form an angle having a value selected from one of a first range greater than 0 degrees but less than 90 degrees, and a second range greater than 90 degrees but less than 180 degrees, each face being substantially parallel to said central axis; and, a caliper assembly mounted to the vehicle and having a housing, said housing including an inboard portion and an outboard portion on opposite sides of said rotor for receiving the friction elements wherein said inboard and outboard portions are connected by a bridge portion, said caliper assembly further including fluid motor means for urging said friction elements into contact with said opposing friction faces of said annular member during braking, said fluid motor means including a fluid actuated piston slidably disposed in said housing to move along a longitudinal axis for urging opposing contacting surfaces of said friction elements against said opposing friction faces of said annular member, said longitudinal axis being substantially perpendicular to said opposing friction faces wherein a line of force as applied by said contacting surfaces is perpendicular to said opposing friction faces, said longitudinal axis and said line of force being coincident.

2. The disc brake assembly of claim 1 wherein said fluid motor means is disposed in said inboard portion of said housing.

3. The disc brake assembly of claim 1 wherein said rotor further includes a cylindrical, axially extending barrel portion coupling said flange to said annular member.

4. A disc brake assembly for use in a vehicle having a rotatable hub, comprising:

a rotor mounted to the hub of the vehicle for rotation therewith about an axis of rotation, said rotor including a mounting flange portion for mounting a wheel thereagainst, a cylindrical barrel portion extending from said mounting flange, and an annular member extending from said barrel portion and having a central axis and two opposing friction faces for contacting a respective friction element during braking wherein each face is substantially parallel to said central axis, said mounting flange extending radially relative to said axis of rotation, said barrel portion being axially-oriented relative to said axis of rotation, said annular member being disposed such that said central axis and a line perpendicular to said axis of rotation form a predetermined slant angle therebetween, said slant angle being about 45°; and, a caliper assembly mounted to the vehicle and having a housing, said housing including an inboard portion and an outboard portion on opposite sides of said rotor for receiving the friction elements wherein said inboard and outboard portions are connected by a bridge portion, said caliper assembly further including fluid motor means for urging said friction elements into contact with said opposing friction faces of said annular member during braking, said fluid motor means including a fluid actuated piston slidably disposed in said housing to move along a longitudinal axis for urging opposing contacting surfaces of said friction elements against said opposing friction faces of said annular member, said longitudinal axis being substantially perpendicular to said opposing friction faces wherein a line of force as applied by said contacting surfaces is perpendicular to said opposing friction faces, said longitudinal axis and said line of force being coincident.

* * * * *

UNITED STATES PATENT AND TRADEMARK OFFICE
CERTIFICATE OF CORRECTION

PATENT NO. : 5,558,184
DATED : September 24, 1996
INVENTOR(S) : Kullmann et al

It is certified that error appears in the above-indentified patent and that said Letters Patent is hereby corrected as shown below:

Assignee: ITT Automotive

Please insert --Inc.-- after "ITT Automotive"

Signed and Sealed this

Twenty-second Day of April, 1997

Attest:

BRUCE LEHMAN

*Commissioner of Patents and Trademarks*

*Attesting Officer*